US012734512B2

(12) United States Patent
Seong et al.

(10) Patent No.: US 12,734,512 B2
(45) Date of Patent: Sep. 15, 2026

(54) FILTER FOR AIR PURIFICATION AND MANUFACTURING METHOD THEREOF

(71) Applicants: HYUNDAI MOTOR COMPANY, Seoul (KR); KIA CORPORATION, Seoul (KR); UNIVERSITY OF SEOUL INDUSTRY COOPERATION FOUNDATION, Seoul (KR)

(72) Inventors: Kwangmo Seong, Bucheon-si (KR); Jungsik Kim, Seoul (KR)

(73) Assignees: HYUNDAI MOTOR COMPANY, Seoul (KR); KIA CORPORATION, Seoul (KR); UNIVERSITY OF SEOUL INDUSTRY COOPERATION FOUNDATION, Seoul (KR)

( * ) Notice: Subject to any disclaimer, the term of this patent is extended or adjusted under 35 U.S.C. 154(b) by 486 days.

(21) Appl. No.: 18/507,372

(22) Filed: Nov. 13, 2023

(65) Prior Publication Data

US 2024/0326031 A1 Oct. 3, 2024

(30) Foreign Application Priority Data

Mar. 30, 2023 (KR) ........................ 10-2023-0042079

(51) Int. Cl.

| | |
|---|---|
| ***B01J 35/39*** | (2024.01) |
| ***B01D 53/86*** | (2006.01) |
| ***B01D 53/88*** | (2006.01) |
| ***B01J 21/06*** | (2006.01) |
| ***B01J 23/04*** | (2006.01) |

(Continued)

(52) U.S. Cl.

CPC .......... *B01J 35/39* (2024.01); *B01D 53/8634* (2013.01); *B01D 53/8668* (2013.01); *B01D 53/885* (2013.01); *B01J 21/063* (2013.01); *B01J 23/04* (2013.01); *B01J 29/00* (2013.01); *B01J 35/50* (2024.01); *B01J 35/56* (2024.01); *B01J 37/0018* (2013.01); *B01J 37/0236* (2013.01); *B01J 37/0244* (2013.01); *B01J 37/343* (2013.01); *B01D 2255/20707* (2013.01);

(Continued)

(58) Field of Classification Search

CPC ............ B01D 39/2075; B01D 46/0005; B01D 46/0028; B01D 53/8634; B01D 53/8668; B01D 53/885; B01D 2255/20707; B01D 2255/20761; B01D 2255/40; B01D 2255/802; B01D 2257/406; B01D 2257/7027; B01D 2257/708; B01D 2257/90; B01J 21/063; B01J 23/04; B01J 29/00; B01J 35/39; B01J 35/50; B01J 35/56; B01J 37/0018; B01J 37/0236; B01J 37/0244; B01J 37/343

See application file for complete search history.

(56) References Cited

FOREIGN PATENT DOCUMENTS

EP 4122505 A1 * 1/2023 ............... A61L 9/18

* cited by examiner

*Primary Examiner* — Brian A Mccaig
(74) *Attorney, Agent, or Firm* — MCDONNELL BOEHNEN & BERGHOFF LLP

(57) ABSTRACT

A filter for air purification includes an air-permeable body frame and a photocatalyst member provided in the body frame. The photocatalyst member includes at least one mesh slit and a plurality of bead layers disposed on both sides of the mesh slit to be spaced apart from each other wherein the bead layers include a plurality of photocatalyst-containing beads aligned in a single layer to be spaced apart from each other at regular intervals.

18 Claims, 5 Drawing Sheets

(51) Int. Cl.

| | |
|---|---|
| ***B01J 29/00*** | (2006.01) |
| ***B01J 35/50*** | (2024.01) |
| ***B01J 35/56*** | (2024.01) |
| ***B01J 37/00*** | (2006.01) |
| ***B01J 37/02*** | (2006.01) |
| ***B01J 37/34*** | (2006.01) |

(52) U.S. Cl.

CPC .. *B01D 2255/802* (2013.01); *B01D 2257/406* (2013.01); *B01D 2257/7027* (2013.01); *B01D 2257/90* (2013.01)

FILTER FOR AIR PURIFICATION AND MANUFACTURING METHOD THEREOF

CROSS REFERENCE TO RELATED APPLICATIONS

This application claims the benefit of priority to Korean Patent Application No. 10-2023-0042079, filed on Mar. 30, 2023 in the Korean Intellectual Property Office, the disclosure of which is incorporated herein by reference.

TECHNICAL FIELD

The present disclosure relates to a filter for air purification including photocatalyst-containing beads and a method of manufacturing the filter for air purification.

BACKGROUND

As air pollution is getting worse in recent years, demand for air purification systems (air purifiers, air purification device, and the like) to improve the quality of air is increasing. As a result, various studies have been extensively conducted into methods for effectively purifying indoor air polluted by various air pollutants, vehicle exhaust gases, volatile organic compounds (VOCs), harmful gases, odors, viruses, and the like. Among these studies, air purifying technology by using a photocatalyst material having strong photolysis function has drawn considerable attention.

Titanium dioxide ($TiO_2$), known as a representative photocatalyst material, generates radicals with strong oxidizing power when exposed to ultraviolet light. Such radicals may decompose various environmental pollutants present in water or in the air into harmless carbon dioxide and water. In addition, because titanium dioxide is chemically very stable without changing even when exposed to light, it is advantageous to use titanium dioxide semi-permanently.

Meanwhile, active oxygen ($O_2$) or hydroxyl radicals (·OH) generated by photoreaction have higher oxidizing power than conventional chlorine ($Cl_2$) or ozone ($O_3$), thereby having superior sterilization against harmful viruses and bacteria and deodorization against odors.

However, although titanium dioxide is an excellent photocatalyst as a single-component material, photolytic reaction occurs only upon absorbing ultraviolet light having a high energy (UV, $\lambda \leq 390$ nm) due to a large energy bandgap (e.g., a band gap of anatase: 3.2 eV). Therefore, in the case where titanium dioxide is exposed to sunlight, only about 3 to 4% of ultraviolet light contained in the sunlight may be absorbed by the titanium dioxide.

In addition, there are many limits to directly apply titanium dioxide itself to apparatuses for reducing air pollutants, and the like. Therefore, numerous studies are being conducted to effectively use photocatalyst materials in air purification apparatuses.

SUMMARY

In general, a photocatalyst-containing material prepared in the form of a plurality of beads and inserted into a mesh frame is used to utilize photocatalyst materials in air purifiers. However, in the case where the plurality of beads are randomly inserted into a frame, frictional abrasion is caused by contact between the beads in a vibrating environment, for example, in a vehicle. Due to such frictional abrasion, beads may be damaged or the photocatalyst is detached from the surfaces of the beads to generate fine powder (containing Cu, Sr, Ti, or the like) and the fine powder is adhered to a surface of an evaporator core or a heater core causing a problem of inducing potential difference corrosion. Furthermore, in the case where the beads are continuously damaged, the amount of the photocatalyst in the filter decreases, resulting in deterioration of photolysis performance.

Therefore, an aspect of the present disclosure is to provide a filter for air purification having a structure capable of maximizing photodegradation efficiency and minimizing contact between the plurality of photocatalyst-containing beads and a manufacturing method thereof.

However, the technical problems to be solved by the present disclosure are not limited to the aforementioned problems, and any other technical problems not mentioned herein will be clearly understood from the following description by those skilled in the art to which the present disclosure pertains.

Additional aspects of the disclosure will be set forth in part in the description which follows and, in part, will be obvious from the description, or may be learned by practice of the disclosure.

In accordance with an aspect of the disclosure, a filter for air purification includes an air-permeable body frame, and a photocatalyst member provided in the body frame, wherein the photocatalyst member includes: at least one mesh slit; and a plurality of bead layers disposed on both sides of the mesh slit to be spaced apart from each other, wherein the bead layers comprise a plurality of photocatalyst-containing beads aligned in a single layer to be spaced apart from each other at regular intervals.

In addition, the photocatalyst member may include a first bead layer and a second bead layer disposed on both sides of a first mesh slit to be spaced apart from each other, a second mesh slit disposed on the second bead layer, and a third bead layer disposed on the second mesh slit.

In addition, the plurality of photocatalyst-containing beads may include a photoluminescent support comprising a phosphor material, a binder, and zeolite; a plurality of transition metal particles loaded on the surface of the photoluminescent support, and a photocatalyst layer coated on a surface of the transition metal particle-loading photoluminescent support.

In addition, the phosphor material may include at least one selected from $CaAl_2O_4$:(Eu,Nd)-based, $SrAl_2O_4$:(Eu,Dy)-based, $Sr_4Al_{14}O_{25}$:(Eu,Dy)-based, $BaAl_2O_4$:(Eu,Dy)-based, $(Sr,Ba)_2MgSi_2O_7$:(Eu,Dy)-based, $Ba_4(Si_3O_8)_2$:(Eu,Dy)-based, and [Ca,Sr,Ba]—Al—O-based compounds.

In addition, the binder may include at least one selected from sodium silicate ($Na_2SiO_3$), sodium polyphosphate $(NaPO_3)_n$, liquid silica, and glaze.

In addition, the transition metal particles may include at least one selected from Cr, Mn, Fe, Co, Ni, Cu, Zn, Zr, Ru, Rh, Pd, Ag, Ta, W, Pt, and Au.

In addition, the photocatalyst layer may include at least one photocatalyst material selected from titanium dioxide ($TiO_2$), graphite carbon nitride (g-$C_3N_4$), and a combination thereof.

In addition, the photocatalyst layer may further include $SiO_2$.

In accordance with another aspect of the disclosure, a method of manufacturing a filter for air purification includes preparing a plurality of photocatalyst-containing beads, stacking a first bead layer on a first mesh frame by aligning the plurality of photocatalyst-containing beads to be spaced apart from each other at regular intervals, stacking a mesh slit on the first bead layer, stacking a second bead layer on the mesh slit by aligning the plurality of photocatalyst-containing beads to be spaced apart from each other at regular intervals, and stacking a second mesh frame on the second bead layer.

In addition, the method may further include manufacturing a body frame by connecting edges of the first mesh frame with edges of the second mesh frame.

In addition, the preparing of the plurality of photocatalyst-containing beads may include: preparing a photoluminescent support; loading a plurality of transition metal particles on a surface of the photoluminescent support; and coating a surface of a transition metal-loading photoluminescent support with a photocatalyst layer.

In addition, the preparing of the photoluminescent support may include manufacturing a phosphor slurry by mixing phosphor powder, a binder, zeolite, and distilled water, manufacturing a semi-solid photoluminescent support by injecting the phosphor slurry into a mold for preparing beads and demolding, and manufacturing a photoluminescent support by drying and heat-treating the semi-solid photoluminescent support.

In addition, the phosphor powder may include at least one phosphor material selected from $CaAl_2O_4$:(Eu,Nd)-based, $SrAl_2O_4$:(Eu,Dy)-based, $Sr_4Al_{14}O_{25}$:(Eu,Dy)-based, $BaAl_2O_4$:(Eu,Dy)-based, $(Sr,Ba)_2MgSi_2O_7$:(Eu,Dy)-based, $Ba_4(Si_3O_8)_2$:(Eu,Dy)-based, and [Ca,Sr,Ba]—Al—O-based compounds, and the binder may include at least one selected from sodium silicate ($Na_2SiO_3$), sodium polyphosphate $(NaPO_3)_n$, liquid silica, and glaze.

In addition, the loading of the plurality of transition metal particles on the surface of the photoluminescent support may include preparing a transition metal loading solution by dissolving a transition metal salt in an alcohol, adding the photoluminescent support to the transition metal loading solution, and performing sonication and filtering, and drying and heat-treating a resultant.

In addition, the transition metal salt may include at least one selected from copper nitrate trihydrate $[Cu(NO_3)_2 \cdot 3H_2O]$ and coper sulfate pentahydrate $(CuSO_4 \cdot 5H_2O)$.

In addition, the coating of the surface of the transition metal-loading photoluminescent support with the photocatalyst layer may be performed by applying at least one method selected from a sol-gel method, a hydrothermal synthesis method, and a chemical vapor deposition (CVD) method thereto.

In addition, the coating of the surface of the transition metal-loading photoluminescent support with the photocatalyst layer may include manufacturing a photocatalyst sol by mixing a photocatalyst precursor, an alcohol-based solution, and an acid, performing hydrothermal synthesis on the transition metal-loading photoluminescent support and the photocatalyst sol to coat the surface of the transition metal-loading photoluminescent support with the photocatalyst, and drying and heat-treating a resultant.

In addition, the photocatalyst precursor may include at least one selected from titanium tetra-isopropoxide $[Ti(OCH(CH_3)_2)_4]$, tetrabutyl titanate $[Ti(C_4H_9O)_4]$, and tetraethoxy titanium $[Ti(OCH_2CH_3)_4]$.

DETAILED DESCRIPTION

Figure 1:
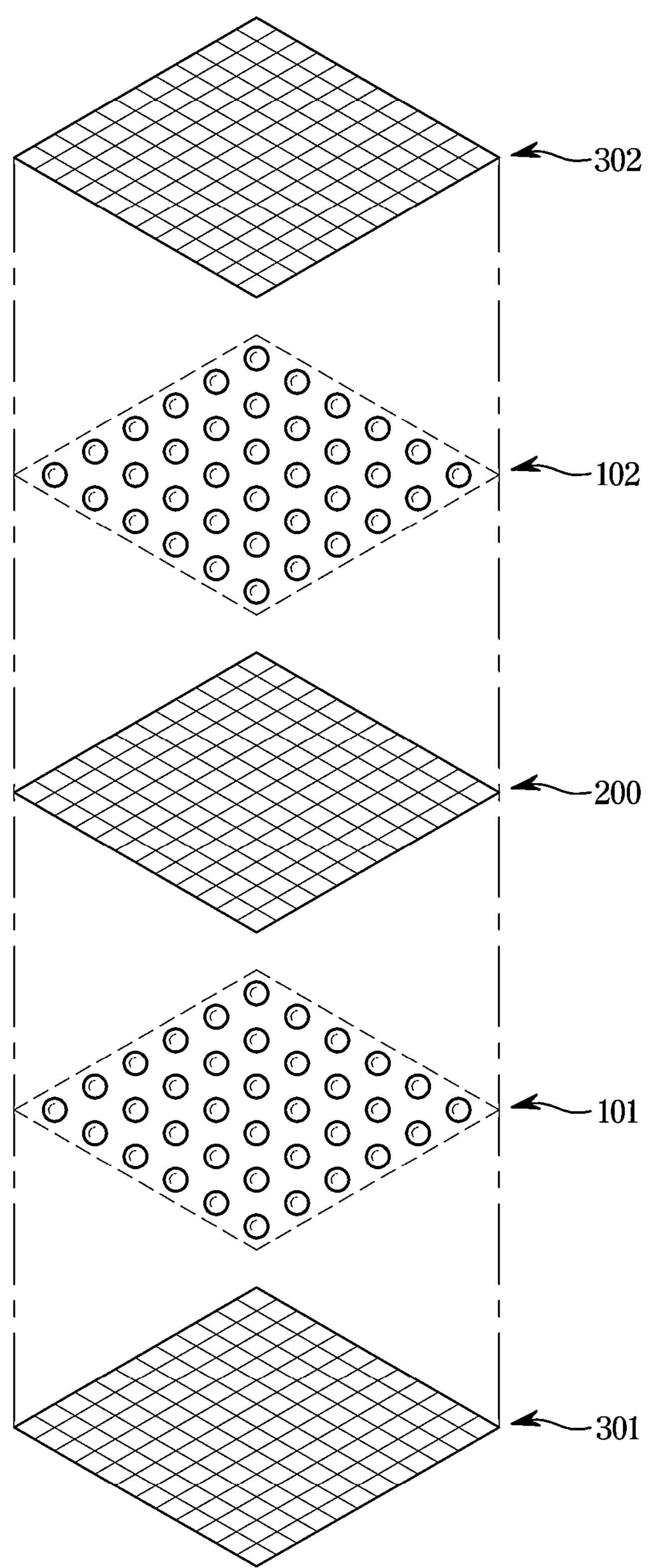
FIG. 1 is an exploded perspective view of a filter for air purification according to an embodiment.

Various embodiments and terms used herein are not intended to limit technical features disclosed herein to the particular embodiments. However, it should be understood that it is not intended to limit the present disclosure to the particular forms disclosed, but on the contrary, the present disclosure is to cover all modifications, equivalents, and alternative falling within the spirit and the scope of the disclosure.

With respect to descriptions of the drawings, like reference numerals denote like elements.

Singular forms corresponding to items may include one item or a plurality of items unless the context clearly indicates otherwise.

Throughout the specification, the phrases "A or B", "at least one of A and B", "at least one of A or B", "A, B or C", "at least one of A, B and C", and "at least one of A, B, or C" mean any one of the items listed together with the phrases or all possible combinations thereof.

The term "and/or" includes any combination of a plurality of related elements or any one of a plurality of related elements.

The terms "first", "second", and the like may be used to distinguish one element from another, without limiting the elements in other aspects (e.g., importance or order).

In addition, the terms 'front', 'rear', 'upper', 'lower', 'side', 'left', 'right', 'top', and 'bottom' used herein are defined based on the drawings, and shapes and positions of the components are not limited by these terms.

Also, it is to be understood that the terms such as "include", "have", or the like, are intended to indicate the existence of the features, numbers, operations, components, parts, or combinations thereof disclosed in the specification, and are not intended to preclude the possibility that one or more other features, numbers, operations, components, parts, or combinations thereof may exist or may be added.

When an element is "connected to", "coupled to", "supported by" or "brought into contact with" another element, it may be directly connected to, coupled to, supported by, or brought into contact with the other element or indirectly connected to, coupled to, supported by, or brought into contact with the other element via a third intervening element.

When an element is referred to as being "on" another element, it may be directly on the other element or intervening elements may be present.

The terms "about", "substantially", etc. used throughout the specification means that when a natural manufacturing and a substance allowable error are suggested, such an allowable error corresponds the value or is similar to the value, and such values are intended for the sake of clear understanding of the present disclosure or to prevent an unconscious infringer from illegally using the disclosure.

Hereinafter, filters for air purification and manufacturing methods thereof according to various embodiments will be described in detail with reference to the accompanying drawings.

Figure 2:
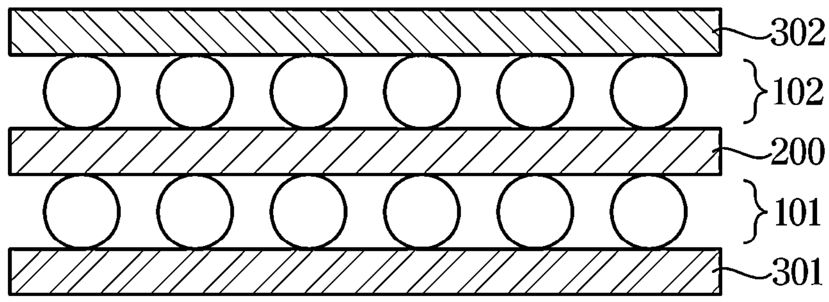
FIG. 2 is a cross-sectional view of a filter for air purification according to an embodiment.

FIG. 1 is an exploded perspective view of a filter for air purification according to an embodiment. FIG. 2 is a cross-sectional view of a filter for air purification according to an embodiment.

As shown in FIGS. 1 and 2, a filter for air purification according to an embodiment includes an air-permeable body frame 301 and 302 and a photocatalyst member 101, 200, and 102 provided in the body frame 301 and 302. In addition, the photocatalyst member includes at least one mesh slit 200 and a plurality of bead layers 101 and 102 disposed on both sides of each of the at least one mesh slit 200 to be spaced apart from each other.

The bead layers 101 and 102 include a plurality of photocatalyst-containing beads aligned in a single layer to be spaced apart from each other at regular intervals not to be in contact with each other. This structure may minimize friction between the photocatalyst-containing beads even in a vibrating environment to prevent generation of fine powder and deterioration in photolysis performance.

Figure 3:
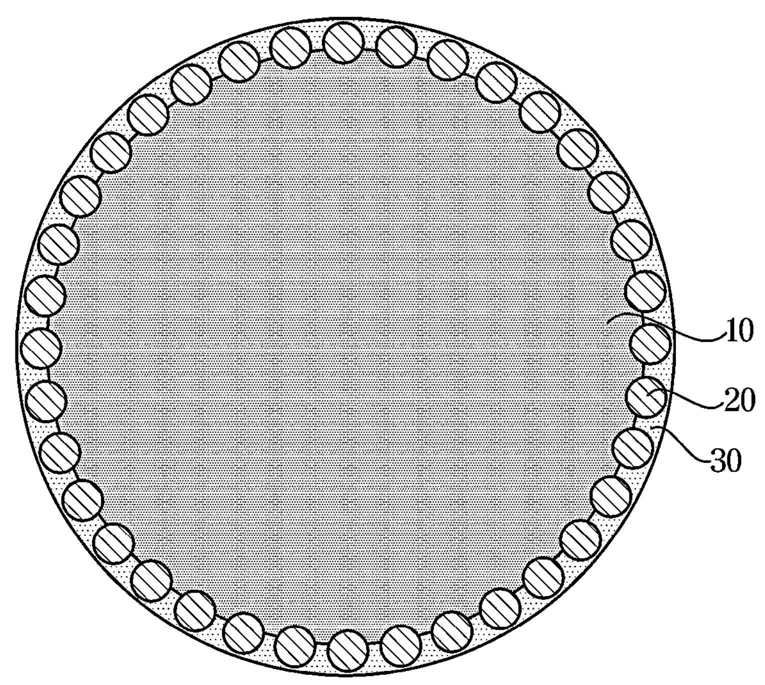
FIG. 3 is a cross-sectional view of a photocatalyst-containing bead according to an embodiment.

FIG. 3 is a cross-sectional view of a photocatalyst-containing bead according to an embodiment.

Referring to FIG. 3, a photocatalyst-containing bead includes a photoluminescent support 10, a plurality of transition metal particles 20 loaded on a surface of the photoluminescent support 10, and a photocatalyst layer 30 formed by coating a photocatalyst material on the surface of the photoluminescent support on which the transition metal particles are loaded.

The photoluminescent support 10 includes a phosphor material, a binder, and zeolite, enables photolytic reaction even in a dark environment without light, and serves as a support to effectively fix nano-sized photocatalyst materials. Specifically, the photoluminescent support 10 may be prepared into small granules having a diameter of about 1 to 8 mm by adding the binder and zeolite to the phosphor powder. In the case where the size range is satisfied, a highest photodegradation efficiency may be obtained.

The phosphor material is a light-emitting material in the form of powder having high luminance and long phosphorescence, and any materials that absorb light and emit light may be used without limitation. Examples of the phosphor material may include at least one phosphor selected from $CaAl_2O_4$:(Eu,Nd)-based, $SrAl_2O_4$:(Eu,Dy)-based, $Sr_4Al_{14}O_{25}$:(Eu,Dy)-based, $BaAl_2O_4$:(Eu,Dy)-based, $(Sr,Ba)_2MgSi_2O_7$:(Eu,Dy)-based, $Ba_4(Si_3O_8)_2$:(Eu,Dy)-based, and [Ca,Sr,Ba]—Al—O-based compounds. More specifically, the phosphor material may be $CaAl_2O_4$:($Eu^{2+}$, $Nd^{3+}$) exhibiting blue fluorescence, $SrAl_2O_4$:($Eu^{2+}$, $Nd^{3+}$) exhibiting green fluorescence, $BaAl_2O_4$:($Eu^{2+}$, $Nd^{3+}$) exhibiting blue fluorescence, and $Sr_4Al_{14}O_{25}$:($Eu^{2+}$, $Nd^{3+}$) exhibiting bluish green fluorescence, or the like.

The binder may include at least one inorganic material such as sodium silicate ($Na_2SiO_3$), sodium polyphosphate $(NaPO_3)_n$, liquid silica, and glaze.

The zeolite may be a raw material in a powder form represented by formula $(W_mZnO_2)_n \cdot nH_2O$ (where W is Na, Ca, Ba, or Sr, and Z=Si+Al).

Referring to FIG. 3, the plurality of transition metal particles 20 that lower photo-activation energy are loaded on the surface of the photoluminescent support 10. A transition metal binds to a photocatalyst material to lower photo-activation energy of the photocatalyst material, and thus reactive radicals may be easily generated thereby not only under ultraviolet light but also under visible light.

The transition metal particles 20 serve to improve photolysis performance by lowering photo-activation energy of the photocatalyst. For example, the transition metal particles 20 may include at least one transition metal selected from Cr, Mn, Fe, Co, Ni, Cu, Zn, Zr, Ru, Rh, Pd, Ag, Ta, W, Pt, and Au, and Cu is preferably used.

Referring to FIG. 3, the photocatalyst layer 30 is coated on the photoluminescent support 10 on which the transition metal particles 20. The photocatalyst layer 30 may be formed of a photocatalyst material in the form of a plurality of nanoparticles.

The photocatalyst material may include titanium dioxide ($TiO_2$), graphite carbon nitride (g-$C_3N_4$), a hybrid material of these materials [g-$C_3N_4$/$TiO_2$:(Fe,Cu,Co,Ni,N)], or the like which have the ability to photodegrade various types of organic materials and harmful gases by photo-activation upon absorbing light such as sunlight. For example, in the case of titanium dioxide is used as the photocatalyst material, the photocatalyst material may be crystallized in an anatase phase.

The photocatalyst layer 30 may further include $SiO_2$ to increase binding strength between the transition metal particle 20—loading photoluminescent support 10 and the photocatalyst layer 30. By increasing the binding strength between the transition metal particle-loading photoluminescent support and the photocatalyst layer, photodegradation efficiency may further be increased.

In the photocatalyst-containing beads according to an embodiment, the photocatalyst material on the surface is photo-activated by external ultraviolet or visible light to generate highly reactive radicals (such as hydroxyl ions and reactive oxygen species) capable of decomposing pollutants such as harmful gases and organic materials in the air.

Meanwhile, as the phosphor material, one of the components of the photocatalyst-containing beads, emits light via excitation and de-excitation occurring by light such as sunlight received from the outside, and the photocatalyst material on the surface is photo-activated by the light emitted from the phosphor material.

In addition, the transition metal particles loaded on the surface of the photoluminescent support bind to the photocatalyst material to lower the photo-activation energy of the photocatalyst material so as to easily generate reactive radicals. During this process, additional photolytic reaction of pollutants may occur, and the photocatalyst-containing beads according to an embodiment may significantly increase photolytic reaction efficiency by such additional photolytic reaction compared to conventional materials including only a photocatalyst.

The mesh slit 200 is inserted between the plurality of bead layers 101 and 102 to prevent contact between the photocatalyst-containing beads. Thus, friction between the photocatalyst-containing beads may be minimized even in a vibrating environment, thereby preventing generation of fine powder and deterioration in photolysis performance.

Although a case of using one mesh slit is shown in FIGS. 1 and 2, the number of the mesh slits may be adjusted if required. For example, in the case where the photocatalyst member includes n bead layers, (n−1) mesh slits may be inserted between the bead layers. More specifically, in the case where the photocatalyst member includes 3 bead layers, a first bead layer and a second bead layer may be disposed on both sides of a first mesh slit to be spaced apart from each other, and a second mesh slit may be disposed on the second bead layer, and a third bead layer may be stacked on the second mesh slit.

The mesh slit 200 may be formed of any metallic material well known in the art without limitation and may have a mesh structure to obtain superior air-permeability.

The air-permeable body frame 301 and 302 may include a first mesh frame 301 located at a lower area of the filter for air purification and a second mesh frame 302 located at an upper area of the filter for air purification. For example, the air-permeable body frame may be provided such that edges of the lower first mesh frame 301 are coupled to edges of the second mesh frame 302 to fix the photocatalyst member between the first mesh frame 301 and the second mesh frame 302.

The air-permeable body frame 301 and 302 may be formed of any metallic material well known in the art without limitation and may have a mesh structure to obtain superior air-permeability.

A method of manufacturing a filter for air purification according to an embodiment includes preparing a plurality of photocatalyst-containing beads, stacking a first bead layer 101 on a first mesh frame 301 by aligning the plurality of photocatalyst-containing beads to be spaced apart from each other at regular intervals, stacking a mesh slit 200 on the first bead layer 101, stacking a second bead layer 102 on the mesh slit 200 by aligning the plurality of photocatalyst-containing beads to be spaced apart from each other at regular intervals, and stacking a second mesh frame 302 on the second bead layer 102.

First, in order to manufacture a filter for air purification according to an embodiment, a plurality of photocatalyst-containing beads are prepared.

In an embodiment, to prepare the plurality of photocatalyst-containing beads, a photoluminescent support 10 is prepared, the plurality of transition metal particles 20 are loaded on the surface of the photoluminescent support 10, and a photocatalyst layer 30 is formed on the surface.

Specifically, phosphor powder, a binder, zeolite, and distilled water are mixed to prepare a phosphor slurry, and the phosphor slurry is injected into a mold for manufacturing beads and demolded to prepare a semi-solid photoluminescent support. The semi-solid photoluminescent support is dried and heat-treated to prepare a photoluminescent support 10. For example, the photoluminescent support 10 may be prepared in the form of small particles having a diameter of about 1 to 8 mm by using a silicone mold.

The phosphor powder may be a $CaAl_2O_4$:(Eu,Nd)-based, $SrAl_2O_4$:(Eu,Dy)-based, $Sr_4Al_{14}O_{25}$:(Eu,Dy)-based, $BaAl_2O_4$:(Eu,Dy)-based, $(Sr,Ba)_2MgSi_2O_7$:(Eu,Dy)-based, $Ba_4(Si_3O_8)_2$:(Eu,Dy)-based, or [Ca,Sr,Ba]—Al—O-based compound.

The binder may be sodium silicate ($Na_2SiO_3$), glaze (glaze), or the like, but is not limited thereto.

The zeolite may be a raw material in a powder form represented by formula $(W_mZ_nO_2)_n \cdot nH_2O$ (where W is Na, Ca, Ba, or Sr, and Z=Si+Al).

For example, the photoluminescent support may be prepared as follows. Phosphor powder ($Sr_4Al_{14}O_{25}$:$Eu^{2+}$, $Dy^{3+}$, etc.) and a mixture of a binder ($Na_2SiO_3$) and zeolite powder were weighed in a weight ratio of 1:0.5 to 1 and then mixed with distilled water by stirring to prepare a slurry. The phosphor slurry is injected into a silicone mold having a diameter of about 3 mm and demolded to manufacture a semi-solid photoluminescent support in the form of particles in large quantities. The semi-solid photoluminescent support is dried and heat-treated at room temperature and in an electric oven to obtain hard beads in a bulk form.

Meanwhile, despite the above descriptions, methods for manufacturing the phosphor slurry and the photoluminescent support are not necessarily limited to the embodiments described above. Various other methods may also be applied as long as the requirements for forming the photoluminescent support are satisfied.

Subsequently, the plurality of transition metal particles 20 are loaded on the surface of the photoluminescent support 10 by using a transition metal mixed solution.

In an embodiment, in order to load the plurality of transition metal particles 20 on the surface of the photoluminescent support 10, a transition metal loading solution is prepared by dissolving a transition metal salt in an alcohol, and the photoluminescent support is added to the transition metal loading solution and sonicated and filtered, followed by drying and heat treatment.

In this case, the transition metal salt may include at least one selected from copper nitrate trihydrate [$Cu(NO_3)_2 \cdot 3H_2O$] and coper sulfate pentahydrate ($CuSO_4 \cdot 5H_2O$). In addition, a concentration of the transition metal loading solution may be from 0.600 M to 0.170 M, preferably from 0.620 M to 0.165 M. When the concentration range described above is satisfied, the effect on increasing photocatalyst efficiency may be increased.

For example, copper nitrate trihydrate is dissolved in an alcohol to prepare a solution having a concentration of 0.62 M to 0.165 M. The photoluminescent support is added to the solution, followed by sonication and filtering. Then, the resultant is dried and heat-treated at room temperature and in an electric oven, thereby preparing a transition metal-loading photoluminescent support. Specifically, the dried transition metal-loading photoluminescent support may be heat-treated in a reducing atmosphere by injecting a nitrogen-hydrogen mixed gas.

Subsequently, a photocatalyst sol is prepared and applied to the surface of the transition metal-loading photoluminescent support to form a photocatalyst layer, and the photocatalyst layer is heat-treated to prepare photocatalyst-containing beads.

The photocatalyst precursor may be a titanium precursor. The titanium precursor may be, for example, titanium tetra-isopropoxide [$Ti(OCH(CH_3)_2)_4$], tetrabutyl titanate [$Ti(C_4H_9O)_4$], and tetraethoxy titanium [$Ti(OCH_2CH_3)_4$], and titanium tetra-isopropoxide may be preferably used, without being limited thereto.

The photocatalyst layer may be coated by applying at least one method selected from a sol-gel method, a hydrothermal synthesis method, and a chemical vapor deposition (CVD) method.

In an embodiment, in order to coat the surface of the transition metal-loading photoluminescent support with the photocatalyst layer, a photocatalyst precursor, an alcohol solution, and an acid are mixed to prepare a photocatalyst sol, and the photocatalyst layer is coated by hydrothermal synthesis of the transition metal-loading photoluminescent support and the photocatalyst sol, followed by drying and heat treatment.

According to hydrothermal synthesis, for example, titanium tetra-isopropoxide (TTIP, $Ti(OCH(CH_3)_2)_4$) as a titanium precursor, hydrous ethanol, an acid solution ($HNO_3$), and distilled water are mixed and stirred to prepare a titanium sol solution. The transition metal-loading photoluminescent support and the titanium sol solution are subjected to hydrothermal synthesis in an autoclave at a temperature of 110 to 200° C. to coat the titanium dioxide on the transition metal-loading photoluminescent support. The reactor is naturally cooled at room temperature and dried to obtain a plurality of beads.

Furthermore, in the case of using titanium dioxide as the photocatalyst, the method may further include heat treatment at a temperature of 300 to 600° C. for 2 to 8 hours for crystallization of the coated titanium dioxide into an anatase phase.

In addition, the photocatalyst sol may further include a tetraethyl orthosilicate solution. By adding an appropriate amount of a tetra-ethyl orthosilicate (TEOS, $Si(OC_2H_5)_4$) solution together with the titanium precursor, binding strength (adhesiveness) between the phosphor and $TiO_2$ may be increased.

In addition, to prepare the filter for air purification according to an embodiment, the first bead layer 101 provided with the plurality of photocatalyst-containing beads prepared as described above is stacked on the first mesh frame 301. In this case, the photocatalyst-containing beads may be aligned in a single layer to be spaced apart from each other at regular intervals to prevent contact therebetween. Thus, friction between the photocatalyst-containing beads is minimized even in a vibrating environment to prevent generation of fine powder and deterioration in photolysis performance.

In addition, to prepare the filter for air purification according to an embodiment, after the mesh slit 200 is stacked on the first bead layer 101, the second bead layer 102 is stacked thereon. In this regard, the same method for stacking the first surface 101 may be used to stack the second bead layer 102.

Specifically, in order to prevent contact between the first bead layer 101 and the second bead layer 102, the mesh slit 200 is first inserted thereinto before stacking the second bead layer 102. Thus, friction between the photocatalyst-containing beads may be minimized even in a vibrating environment, generation of fine powder and deterioration in photolysis performance may be prevented.

In the case where an amount of the photocatalyst-containing beads is increased to increase photocatalyst efficiency, a plurality of mesh slits and a plurality of bead layers may further be alternately stacked to prevent contact between the photocatalyst-containing beads.

Finally, the second mesh frame 302 is stacked on the second bead layer 102. In this case, the body frame may be fabricated by connecting the edges of the first mesh frame 301 to the edges of the second mesh frame 302 to fix the plurality of bead layers disposed between the first mesh frame 301 and the second mesh frame 302 to the mesh slit.

Hereinafter, the present disclosure will be described in more detail according to the following examples. However, the following examples are merely presented to exemplify the present disclosure, and the scope of the present disclosure is not limited thereto.

EXAMPLES

(1) Preparation of Photocatalyst-Containing Beads $Sr_4Al_{14}O_{25}:Eu^{2+},Dy^{3+}$ powder, as a phosphor, and a mixture of $Na_2SiO_3$, as a binder, and zeolite powder were weighed in a weight ratio of 1:0.5 to 1 and then mixed with distilled water by stirring to prepare a slurry. The phosphor slurry was injected into a silicone mold having a diameter of about 3 mm and demolded to manufacture a semi-solid photoluminescent support in the form of particles in a large quantity. The semi-solid photoluminescent support was dried at room temperature (at about 25° C., for 6 hours) and in an electric oven (at 100° C., for 2 hours) and heat-treated in an electric furnace (at 350° C., for 3 hours) to obtain a photoluminescent support in the form of hard beads in a bulk form.

Subsequently, copper nitrate trihydrate was dissolved in ethanol and stirred at 70° C. for 1 hour to prepare a copper solution having a concentration of 0.62 to 0.165 M. The photoluminescent support prepared as described above was added to the copper solution, followed by sonication and filtering for 10 minutes. The resultant was dried at room temperature (at about 25° C., for 3 hours) and in an electric oven (at 100° C., for 2 hours) and heat-treated in an electric furnace (in a 90% $N_2 \cdot 10\%$ $H_2$ reducing atmosphere, at 300° C., for 2 hours) to prepare a Cu-loading photoluminescent support.

Subsequently, titanium tetra-isopropoxide (TTIP, $Ti(OCH(CH_3)_2)_4$) as a titanium precursor, hydrous ethanol, an acid solution ($HNO_3$), and distilled water were mixed in a volume ratio of 5:40:20:0.5 and stirred (at 50° C., for 2 hours) to prepare a titanium sol solution. The Cu-loading photoluminescent support and the titanium sol solution were put in a Teflon-liner container and subjected to hydrothermal synthesis in an autoclave (at 130° C., for 4 hours) to coat the surface of the Cu-loading photoluminescent support with titanium dioxide. The reactor was naturally cooled at room temperature and the Cu-loading phosphor-photocatalyst beads were collected and dried (at 100° C., for 2 hours). Then, the coated titanium dioxide was heat-treated in an electric furnace (at 450° C., for 2 hours) for crystallization of the titanium dioxide into an anatase phase to obtain photocatalyst-containing beads.

(2) Example: Preparation of Filter for Air Purification 1

Figure 4A:
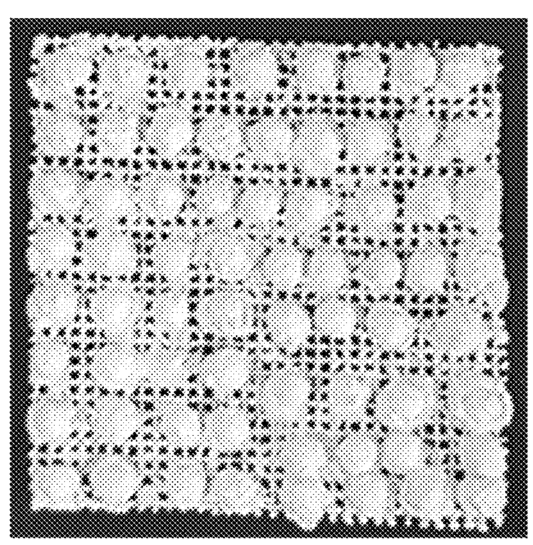
FIG. 4A is a photograph of a sample of a filter for air purification according to an embodiment.

The photocatalyst-containing beads prepared as described above were aligned on a lower metal mesh frame to be spaced apart from each other at regular intervals (See FIG. 4A). A metal mesh slit was stacked on the bead layer, the photocatalyst-containing beads were further aligned thereon to be spaced apart from each other at regular intervals, and an upper metal mesh frame was assembled therewith.

(3) Comparative Example: Preparation of Filter for Air Purification 2

Figure 5A:
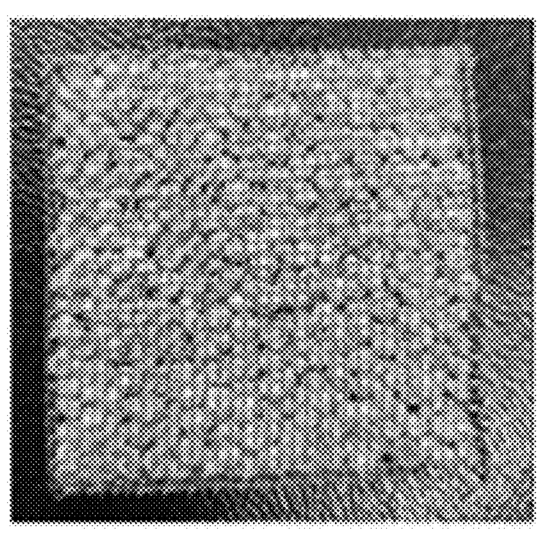
FIG. 5A is a photograph of a sample of a filter for air purification prepared according to a comparative example.

A filter was prepared by inserting the photocatalyst-containing beads into a metal mesh frame without using a slit to be in contact with each other (See FIG. 5A).

Experimental Example 1: Evaluation of Vibration Durability

Vibration durability of the filters prepared according to the example and the comparative example was evaluated as follows. A cylinder was attached to one side of a ball mill, each filter packed in a black box was placed inside the cylinder to transmit vibration generated in the ball mill at 10 rpm into the filter located inside the cylinder via the cylinder.

Figure 4B:
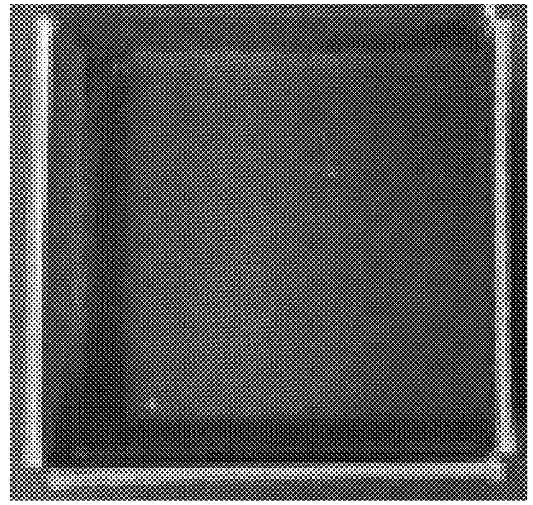
FIG. 4B is a photograph of a filter for air purification prepared according to an embodiment after a durability test (7 days).
Figure 5B:
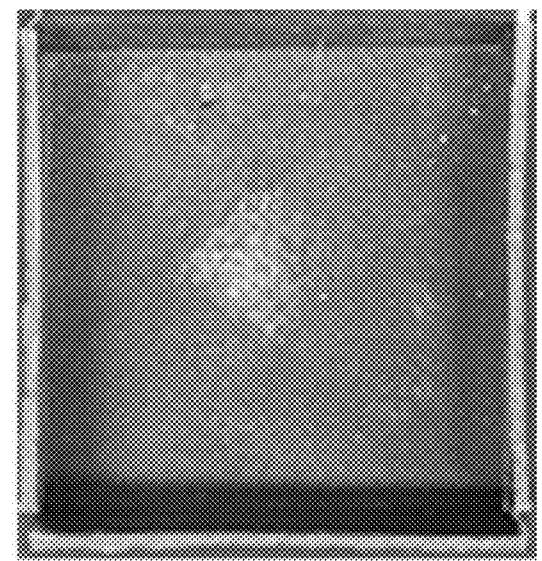
FIG. 5B is a photograph of a filter for air purification prepared according to a comparative example after a vibration durability test (7 days).

FIGS. 4B and 5B are photographs of fine powder generated in the black box after a vibration test was conducted for 7 days using each of the filters prepared in the example and comparative example. Referring to FIGS. 4B and 5B, it may be confirmed that fine powder was not generated in the filter prepared according to the example after the vibration test, while fine powder was generated in the filter prepared according to the comparative example.

Figure 5C:
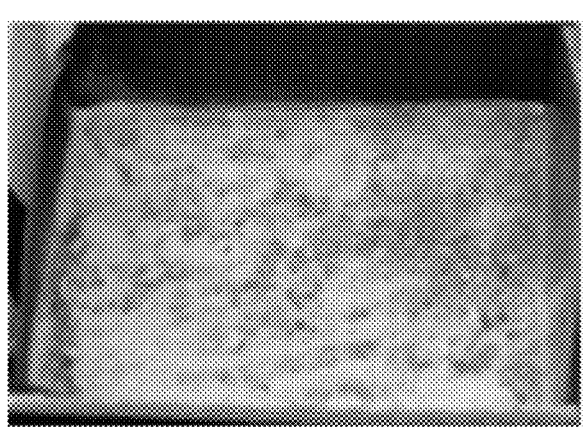
FIG. 5C is a photograph of a filter for air purification prepared according to a comparative example after a vibration durability test (3.5 months).

Meanwhile, FIG. 5C is a photograph of fine powder generated after a driving test in which a vehicle, to which the filter prepared according to the comparative example was applied, was driven 43000 km for 3.5 months. As shown in the drawing, it may be confirmed that a large amount of fine powder is generated in the case where the photocatalyst-beads are brought into contact with each other in an environment where vibrations occur as in the comparative example. The fine powder is generated by detachment of the photocatalyst and the like coated on the beads caused by friction therebetween.

Experimental Example 2: Evaluation of Photolysis Performance

To evaluate photolysis performance of the filters, a deodorization test was conducted using toluene, formaldehyde, and ammonia gas. In this regard, the filters of the example and comparative example were prepared in the same size of 4.0*4.0*0.8 cm (width*length*height) and exposed to a 455 nm LED array, as a light source, for 60 minutes. In this case, the deodorization test was conducted with a gas concentration of 30 ppm and a gas volume of 3 L of toluene/formaldehyde and 10 L of ammonia, and photolysis rates of the gases are shown in Table 1 below.

TABLE 1

| Type of gas | Example | Comparative Example |
|---|---|---|
| Toluene | 16.0% | 18.1% |
| Formaldehyde | 46.4% | 61.3% |
| Ammonia | 100% | 100% |

Referring to Table 1, in the case where the filters of the example and comparative example are prepared in the same size, the number of beads used in the filter of the example is smaller than that used in the comparative example because the metal mesh slit is inserted between the bead layers, and thus deodorization performance of the example was slightly lower than that of the comparative example. However, in the case of increasing the number of beads by adjusting the filter size, photodegradation efficiency is also expected to increase.

According to the present disclosure, photodegradation efficiency of the filter for air purification of the present disclosure may be maximized by loading the transition metal particles on the surface of the photoluminescent support that is a light-emitting material and using beads coated with the nano-photocatalyst material.

In addition, contact between the plurality of photocatalyst-containing beads may be minimized in the filter for air purification according to the present disclosure by using the structure including the bead layers in which the beads are aligned to be spaced apart from each other and the mesh slit inserted between the bead layers.

In addition, detachment of the transition metal or the photocatalyst from the surfaces of the beads may be prevented by minimizing the contact between the beads, thereby inhibiting problems of generation of fine powder and deterioration in photolysis performance.

Also, because the beads are a hybrid composite of the self-emitting phosphor material and the photocatalyst, photolytic reaction of the photocatalyst may continue for a certain period of time by self-emitting property of the phosphor even after exposure to light is stopped.

However, the effects obtainable by the present disclosure are not limited to the aforementioned effects, and any other effects not mentioned herein will be clearly understood from the following description by those skilled in the art to which the present disclosure pertains.

Although embodiments of the disclosure have been shown and described, it would be appreciated by those having ordinary skill in the art that changes may be made in these embodiments without departing from the principles and spirit of the disclosure, the scope of which is defined in the claims and their equivalents.

The invention claimed is:

1. A filter for air purification comprising:

an air-permeable body frame; and a photocatalyst member provided in the body frame;

wherein the photocatalyst member comprises:

at least one mesh slit having a first side and a second side; and a plurality of bead layers disposed on the first side and the second side of the mesh slit and spaced apart from each other;

wherein the plurality of bead layers comprise a plurality of photocatalyst-containing beads aligned in a single layer and spaced apart from each other at regular intervals.

2. The filter for air purification according to claim 1, wherein the photocatalyst member comprises:

a first bead layer and a second bead layer disposed on both sides of a first mesh slit and spaced apart from each other;

a second mesh slit disposed on the second bead layer; and a third bead layer disposed on the second mesh slit.

3. The filter for air purification according to claim 1, wherein the plurality of photocatalyst-containing beads comprises:

a photoluminescent support comprising a phosphor material, a binder, and zeolite;

a plurality of transition metal particles loaded on the surface of the photoluminescent support; and a photocatalyst layer coated on a surface of the transition metal particle-loaded photoluminescent support.

4. The filter for air purification according to claim 3, wherein the phosphor material comprises at least one selected from $CaAl_2O_4$:(Eu,Nd)-based, $SrAl_2O_4$:(Eu,Dy)-based, $Sr_4Al_{14}O_{25}$:(Eu,Dy)-based, $BaAl_2O_4$:(Eu,Dy)-based, $(Sr,Ba)_2MgSi_2O_7$:(Eu,Dy)-based, $Ba_4(Si_3O_8)_2$:(Eu,Dy)-based, and [Ca,Sr,Ba]—Al—O-based compounds.

5. The filter for air purification according to claim 3, wherein the binder comprises at least one selected from sodium silicate ($Na_2SiO_3$), sodium polyphosphate ($NaPO_3$)$_n$, liquid silica, and glaze.

6. The filter for air purification according to claim 3, wherein the transition metal particles comprise at least one selected from Cr, Mn, Fe, Co, Ni, Cu, Zn, Zr, Ru, Rh, Pd, Ag, Ta, W, Pt, and Au.

7. The filter for air purification according to claim 3, wherein the photocatalyst layer comprises at least one photocatalyst material selected from titanium dioxide ($TiO_2$), graphite carbon nitride ($g\text{-}C_3N_4$), and a combination thereof.

8. The filter for air purification according to claim 3, wherein the photocatalyst layer further comprises $SiO_2$.

9. A method of manufacturing a filter for air purification, the method comprising:

preparing a plurality of photocatalyst-containing beads;

stacking a first bead layer on a first mesh frame by aligning the plurality of photocatalyst-containing beads spaced apart from each other at regular intervals;

stacking a mesh slit on the first bead layer;

stacking a second bead layer on the mesh slit by aligning the plurality of photocatalyst-containing beads spaced apart from each other at regular intervals; and stacking a second mesh frame on the second bead layer.

10. The method according to claim 9, further comprising manufacturing a body frame by connecting edges of the first mesh frame with edges of the second mesh frame.

11. The method according to claim 9, wherein the preparing of the plurality of photocatalyst-containing beads comprises:

preparing a photoluminescent support;

loading a plurality of transition metal particles on a surface of the photoluminescent support; and coating a surface of a transition metal-loaded photoluminescent support with a photocatalyst layer.

12. The method according to claim 11, wherein the preparing of the photoluminescent support comprises:

manufacturing a phosphor slurry by mixing phosphor powder, a binder, zeolite, and distilled water;

manufacturing a semi-solid photoluminescent support by injecting the phosphor slurry into a mold for preparing beads and demolding; and manufacturing a photoluminescent support by drying and heat-treating the semi-solid photoluminescent support.

13. The method according to claim 12, wherein the phosphor powder comprises at least one phosphor material selected from $CaAl_2O_4$:(Eu,Nd)-based, $SrAl_2O_4$:(Eu,Dy)-based, $Sr_4Al_{14}O_{25}$:(Eu,Dy)-based, $BaAl_2O_4$:(Eu,Dy)-based, $(Sr,Ba)_2MgSi_2O_7$:(Eu,Dy)-based, $Ba_4(Si_3O_8)_2$:(Eu,Dy)-based, and [Ca,Sr,Ba]—Al—O-based compounds; and the binder comprises at least one selected from sodium silicate ($Na_2SiO_3$), sodium polyphosphate $(NaPO_3)_n$, liquid silica, and glaze.

14. The method according to claim 11, wherein loading of the plurality of transition metal particles on the surface of the photoluminescent support comprises:

preparing a transition metal loading solution by dissolving a transition metal salt in an alcohol;

adding the photoluminescent support to the transition metal loading solution, and performing sonication and filtering; and drying and heat-treating a resultant.

15. The method according to claim 14, wherein the transition metal salt comprises at least one selected from copper nitrate trihydrate [$Cu(NO_3)_2 \cdot 3H_2O$] and copper sulfate pentahydrate ($CuSO_4 \cdot 5H_2O$).

16. The method according to claim 11, wherein the coating of the surface of the transition metal-loaded photoluminescent support with the photocatalyst layer is performed by applying at least one method selected from a sol-gel method, a hydrothermal synthesis method, and a chemical vapor deposition (CVD) method.

17. The method according to claim 11, wherein the coating of the surface of the transition metal-loaded photoluminescent support with the photocatalyst layer comprises:

manufacturing a photocatalyst sol by mixing a photocatalyst precursor, an alcohol-based solution, and an acid;

performing hydrothermal synthesis on the transition metal-loaded photoluminescent support and the photocatalyst sol to coat the surface of the transition metal-loaded photoluminescent support with the photocatalyst; and drying and heat-treating a resultant.

18. The method according to claim 11, wherein the photocatalyst precursor comprises at least one selected from titanium tetra-isopropoxide [$Ti(OCH(CH_3)_2)_4$], tetrabutyl titanate [$Ti(C_4H_9O)_4$], and tetraethoxy titanium [$Ti(OCH_2CH_3)_4$].

* * * * *